1,977,065

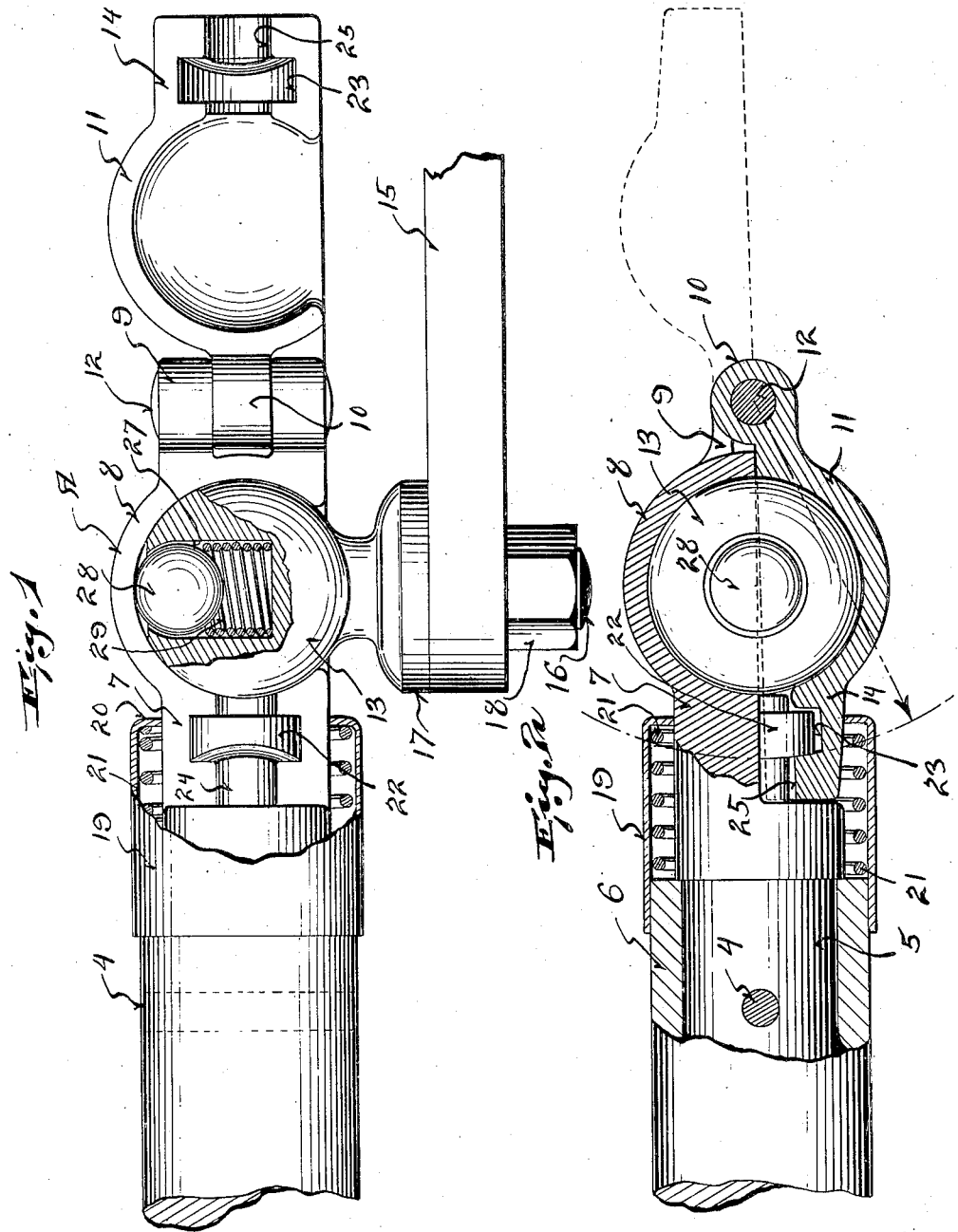
Oct. 16, 1934.    T. H. JACOB    1,977,065
TRAILER HITCH
Filed Aug. 21, 1933
Inventor
T. H. Jacob Patented Oct. 16, 1934

UNITED STATES PATENT OFFICE 1,977,065

TRAILER HITCH

Thomas H. Jacob, Wausau, Wis.

Application August 21, 1933, Serial No. 686,049

5 Claims. (Cl. 280—33.15)

This invention appertains to trailer hitches and more particularly to trailer hitches of the type shown in Patent No. 1,927,591, issued to me September 19, 1933, and the present invention is an improvement thereover.

In the type of trailer hitch shown in my pending application, it was found that considerable strain was placed upon the pivot pin utilized for connecting the semispherical socket members together in view of the fact that the swinging semispherical socket member has positive engagement with the stationary socket member only at the hinge point.

It is, therefore, one of the salient objects of my invention to provide means whereby the swinging socket member will have a positive interlocking engagement with the stationary socket member or the shank thereof, so that when drawing pull is exerted on the socket members through the ball head, such force will be transmitted directly to the shank and thereby eliminate undue strain of the pivot pin of said socket members.

Another important object of my invention is the provision of a projection or boss formed on the shank or stationary semispherical section for reception within a recess formed in the extension of the swinging socket member, whereby the boss will engage the walls of said recess to permit the transmission of the drawing force to the shank, the boss and the walls of the recess being formed in a novel manner to insure proper engagement of one another and to facilitate the opening and closing of said swinging socket member.

A further important object of my invention is the provision of novel means for forming the shank and the extension on the swinging socket member and the spring-pressed closure sleeve, whereby sliding movement of the closure sleeve to its operative position will tend to force and hold the walls of the recess in engagement with the boss.

A further object of my invention is the provision of a spring-pressed wear ball carried by the ball head for engagement with the socket member, the spring-pressed ball acting as means for taking up wear between the ball head and the socket members and to eliminate rattling, lost play between the ball head and the socket members.

A still further object of my invention is to provide a novel trailer hitch of the above character, which will be durable and efficient in use, one that will be simple and easy to manufacture, and one which can be placed upon the market at a reasonable cost.

With these and other objects in view, the invention consists in the novel arrangement, construction and formation of parts, as will be hereinafter more specifically described, claimed and illustrated in the accompanying drawing; in which drawing:—

Figure 1 is a side elevation of my improved trailer hitch, showing the swinging socket member in its fully open position, parts of the hitch being shown broken away and in section to illustrate structural detail.

Figure 2 is a longitudinal section through the trailer hitch, showing the swinging socket member in its fully closed position.

Referring to the drawing in detail, wherein similar reference characters designate the corresponding parts throughout the several views, the letter A generally indicates my improved trailer hitch, which comprises a cylindrical shank 5 for reception within a length of pipe 6 or a tubular extension formed on the trailer tongue (not shown).

The shank 5 is rigidly secured within the tubular extension 6 in any preferred manner, such as by the use of rivets 4. The forward end of the shank 5 is provided with a semicylindrical shank extension 7 on which is formed the stationary semispherical socket member 8. The forward end of the semispherical socket member 8 has formed thereon the spaced pivot ears or hinge barrels 9 for the reception of a mating hinge ear or barrel 10 formed on the forward end of the swinging semispherical socket member 11. A pivot pin 12 is employed for pivotally connecting the ears or barrels 9 and 10 together. The socket members 8 and 11 can be considered as like or companion members for receiving and gripping the ball head 13 therebetween.

The inner end of the swinging socket member is provided with a rearwardly directed semicylindrical shank extension 14, which is adapted to abut against the semicylindrical extension 7 of the shank 5.

The lower end of the ball head 13 is connected in any preferred manner with the drawing vehicle, which can be either a truck or a pleasure car. As shown, a drawbar 15 is provided for connection with the driving vehicle and the same receives a threaded shank 16 formed on the lower end of the ball head 13. An annular flange 17 is formed on the shank for engagement with the upper face of the drawbar and a clamping nut 18 is threaded on the shank for engagement with the lower face of the drawbar.

From the construction so far, it can be seen that when it is desired to connect the trailer with the drawing vehicle, the socket member 11 is swung to its open position, as shown in Figure 2, and the ball is then placed within the socket member 8. The swinging socket member 11 is now swung to its closed position and is retained in such position by means of a sliding sleeve 19 carried by the tubular extension or pipe 6. The forward end of the locking sleeve 19 is provided with an inwardly directed annular flange 20 for sliding engagement with the semicylindrical shank extension 7 and the semicylindrical extension 14 on the swinging socket member 11. Obviously, the engagement of the sleeve with the extension 14 will hold the socket member 11 against opening swinging movement.

When it is desired to disconnect the trailer from the drawing vehicle, it is merely necessary to push back the locking sleeve until the same rides past the extension 14, after which the socket member 11 can be readily swung to its open position.

With this type of hitch, it is never necessary to obtain slack between the drawing vehicle and the trailer before the hitch can be disconnected. The locking sleeve 19 is normally held in its forward locking position by means of a relatively heavy coil spring 21 which is housed within the sleeve 19 and confined between the forward end of the pipe 6 and the flange 21.

In order to relieve strain on the hinge pin 12, a semicircular boss 22 is formed on the inner flat face of the semicylindrical shank extension 7 and this boss is adapted to be received in a semicircular-shaped recess 23 formed in the inner face of the extension 14 on the swinging socket member 11. If preferred, the boss 22 can be braced by a semicylindrical rib 24 formed on the shank extension 7 and the inner face of the extension 14 is provided with a groove 25 for receiving the rib.

By this construction, it can be seen that the walls of the recess 23 will engage the rear face of the boss 22 and consequently, forward thrust on the socket member 11 will be transmitted to the shank 5 through said boss.

To permit the easy swinging of the socket member 11 to its open and closed positions, the rear face of the box and the rear wall of the recess 23 are of an arcuate shape and it is to be noted that these curved faces are struck on an arc, the axis of which is at the axis of the hinge pin 12. Not only does this insure proper swinging movement of the socket member 11, but also insures a maximum amount of engagement between the rear wall of the recess and the rear face of the boss 22.

I preferably construct the shank extension 7 and the extension 14 of the socket member 11 on a taper, so that as the flange 21 of the locking sleeve 19 slides to its locking position, the same will have a wedging effect on the extension 14 to urge the same toward the boss 22.

The ball head 13 is also constructed in a novel manner and it is to be noted that the same is provided with a socket 27 which extends inwardly from the upper end of said ball head. This socket 27 receives a relatively large wear ball 28, which is normally urged slightly beyond the outer surface of the ball head by means of an expansion spring 29. This expansion spring is arranged within the socket and has its opposite ends engaging respectively the wear ball 28 and the inner wall of the socket. After the ball 28 is inserted within the head, the side wall of the socket is forced inwardly around the ball 28 to limit the outward movement thereof.

The wear ball 28 functions to engage the walls of the socket members 8 and 11 with considerable pressure and thus, acts to eliminate rattling between the ball head and the socket members and the wear ball takes up wear as the same occurs between these parts.

From the foregoing description, it can be seen that I have provided a novel trailer hitch in which means is provided for taking care of wear and in which undue strain is eliminated from the hinge pin of the socket members.

Changes in details may be made without departing from the spirit or the scope of my invention but what I claim as new is:—

1. A trailer hitch comprising a shank provided at one end with a semispherical socket, a complementary semispherical socket member hinged to the first mentioned socket and provided with an extension normally engaging the shank, means for locking the extension and complementary socket member against open swinging movement, and interlocking means formed on the extension and shank.

2. A trailer hitch comprising a shank provided at one end with a semispherical socket, a complementary socket member hinged to the first mentioned socket and provided with an extension engaging the shank when the complementary socket member is in its closed position, interlocking means formed on the extension and shank for engagement with one another when the complementary socket member is in its closed position, and releasable means normally holding the complementary socket member against swinging movement and for urging the interlocking means toward one another.

3. A trailer hitch comprising a cylindrical shank provided at one end with a coaxial semispherical socket, a complementary socket member hinged to the first mentioned socket and provided with an extension normally engaging the shank when the complementary socket member is in its closed position, a boss formed on the shank, the extension having a recess for receiving the boss when the complementary socket member is in its closed position, and a spring urged sleeve slidably mounted on said shank for engagement over said extension.

4. A trailer hitch comprising a cylindrical shank provided at one end with a coaxial semispherical socket, a complementary socket member hinged to the first mentioned socket and provided with an extension normally engaging the shank when the complementary socket member is in its closed position, a boss formed on the shank, the extension having a recess for receiving the boss when the complementary socket member is in its closed position, and a spring urged sleeve slidably mounted on said shank for engagement over said extension, the extension and shank having rearwardly tapered faces whereby sliding movement of the sleeve will urge the extension toward the shank.

5. A trailer hitch comprising a cylindrical shank provided at one end with a coaxial semispherical socket, hinge ears formed on the forward end of the socket, a complementary socket member having a hinge ear on its forward end, a hinge pin connecting said ears together, an extension on the rear end of the complementary socket member for engagement with the shank when the complementary socket member is in its closed position, a semicircular boss formed on the inner face of the shank, a rib formed on said shank on opposite sides of the boss, the extension having a recess and a groove for receiving the boss and rib when the complementary section member is in its closed position, and a spring urged sleeve slidably mounted on the shank for engagement over said extension, the rear face of the boss and the rear wall of the recess being struck on an arc of a circle having its axis at the center of the hinge pin.

THOMAS H. JACOB.